United States Patent Office 2,712,561
Patented July 5, 1955

2,712,561
METHOD OF DESTROYING CATALYST RESIDUES

Anthony H. Gleason, Westfield, N. J., assignor to Esso Research and Engineering Company, a corporation of Delaware No Drawing. Application December 4, 1953,
Serial No. 396,324

4 Claims. (Cl. 260—669)

This invention relates to an improved method for the destruction of catalyst residues and relates more particularly to the destruction of residues of alkali metals, such as sodium, used in the polymerization of various types of unsaturated hydrocarbons.

Many types of hydrocarbon polymerizations employ alkali metals as the catalyst. Principal among these polymerizations are the polymerization of butadiene and the copolymerization of butadiene and styrene to oily and solid rubbery polymers. Sodium is the most generally used of the alkali metals, but potassium can also be employed. At the end of the reaction the excess unreacted catalyst must be destroyed to prevent further polymerization and the consumed catalyst is to be removed from its complex with the polymer. Various materials have been used for this purpose.

For example, alcohols, such as methanol, and acids such as acetic and sulfuric acid have been used. U. S. Patent 2,543,440 teaches the removal of sodium from liquid polymer by mixing the reaction products with a solution of water, alcohol and a minor portion of sulfuric acid. An oil and water phase is obtained and the sodium is removed by decanting off the water phase. However, the presence of the water phase presents difficulties in that emulsions are formed which are difficult to break. Water also may cause partial separation of any ether modifier which may be present in the polymerization recipe. Furthermore the recycle diluent would have to be dried.

The difficulty in removing the sodium is further complicated by the fact that the sodium in the reactor effluent is present in several forms. In addition to metallic or unreacted sodium there is present a flocculent, semi-gelatinous precipitate consisting of sodium hydroxide, sodium acetylides and possibly other derivatives. It is also present in a soluble form as the alcoholate when an alcohol such as isopropyl is used in the recipe. This latter factor is particularly important since its presence tends to increase the alkalinity of the final drying oil which deleteriously affects the drying and baking rates of the oil. Thus any method of removing sodium must not neglect the neutralization of the soluble sodium alcoholate.

It has now been found that the above difficulties can be overcome and the sodium completely neutralized in a cheap efficient manner by employing the theoretical amount of sulfuric acid of over 80% and less than 96% strength to convert the sodium substantially quantitatively to sodium bisulfate. It would be expected that any sulfuric acid of 45% strength or more would give dry salts which could be removed by filtration provided sufficient neutral sulfate is formed to hydrate with the water in the acid. However, it has been shown that the complete neutralization cannot be accomplished at an acid strength of 80% or less.

The invention is particularly adapted to processes for the preparation of drying oils by the copolymerization of butadiene and styrene. Thus the invention has specific application to the preparation of drying oils by polymerizing 75 to 100 parts of butadiene with 25 to 0 parts of styrene, preferably about 75 to 85 parts of the former and 25 to 15 parts of the latter, the polymerization being carried out at 20–100° C., preferably between 40 and 90° C., in a reaction diluent. As a polymerization catalyst about 1.5 to 10 parts, preferably about 1.5 to 3 parts of a finely divided metallic sodium catalyst is used in the optional presence of various polymerization modifiers which tend to promote the reaction and produce colorless products of more reproducible drying rates. As an inert reaction diluent it is desirable to use, for example, a naphtha of boiling range between about 90–180° C. or a straight run mineral spirit such as Varsol (boiling range 150–200° C.) or inert hydrocarbon diluents boiling between +20° C. and 200° C. such as pentane, xylene, toluene, benzene, cyclohexane or the like, individually or in admixture with each other. The diluents are usually used in amounts ranging from 50 to 500, preferably 150 to 300, parts per 100 parts of monomers. Various ethers having more than two carbon atoms per molecule such as diethyl ether, acetal, dioxane, vinyl ethyl ether, vinyl isobutyl ether, t-butyl methyl ether and methylal, are also useful as diluents and are particularly helpful as co-diluents to insure formation of colorless products when used in amounts ranging from about 10 to 35 parts per 100 parts of monomers, together with the aforesaid amount of inert diluent such as solvent naphtha. Other means of modifying the polymer properties involve the substitution of all or part of the butadiene feed with other diolefins such as isoprene, piperylene, 2,3-dimethyl butadiene-1,3, or 2-methylpentadiene-1,3. Also, instead of styrene, various ring substituted alkyl styrenes such as p-methyl styrene or p-ethyl styrene or the dimethyl styrenes may be used.

Especially where a relatively coarse dispersion of sodium is used as catalyst, it is also advantageous to use about 1 to 50 weight per cent, preferably 10 to 20 weight per cent based on sodium of a $C_1$ to $C_5$ aliphatic alcohol. Secondary and tertiary alcohols, particularly isopropanol or tertiary butanols are preferred. Such alcohols act as polymerization promoters. Conversions of 50 to 100 per cent on monomers are readily realized in batch as well as in continuous polymerization, although the catalyst requirements are greater for continuous than for batch operation.

While the invention has specific practical application to the preparation of drying oils by polymerization of butadiene or copolymerization of butadiene and styrene, it is not limited to such processes, but finds application in all processes wherein alkali metals such as sodium or potassium are used as catalysts, regardless of the product being manufactured. Thus the invention may be used to destroy the catalyst in any process for making resins or rubbery polymers involving the use of alkali metal catalysts.

The following examples illustrate the benefits to be obtained by this invention.

EXAMPLE 1

Five runs were made by placing the following materials in a bomb and shaking for 20 hrs. at 50° C.

300 g. naphtha
    30 g. dioxane
    0.3 g. isopropyl alcohol
    80 g. butadiene
    20 g. styrene
    2 g. sodium At the end of this time the butadiene and styrene were essentially completely copolymerized to an oily material. To the contents of the bombs were added, while stirring, 9 or 10 g. of various strengths sulfuric acid. The following results were obtained.

*Results of quenching polymer oil with sulfuric acid* [a]

| Acid Strength, Percent | Wt. Used per 2 g. Na | Color | Alkalinity of Filtered Oil |
|---|---|---|---|
| 55 | [b] 9 | Yellow | + |
| 65 | 9 | do | + |
| 75 | 9 | do | + |
| 80 | 9 | Colorless | + |
| 80 | [c] 10 | Yellow | + |
| 82.5 | 10 | Colorless | Neutral.[d] |
| 85 | 9 | do | Do.[d] |
| 85 | 10 | do | Do.[d] |
| 96 | 9 | Pale Yellow | Do.[d] |

[a] One hour vigorous agitation.
[b] 90% of theoretical weight of acid required to give maximum ratio $NaHSO_4 \cdot H_2O / Na_2SO_4 \cdot 7H_2O$. (Theoretical wt.=9.8–10.1 g.)
[c] Theoretical amount to give maximum $NaHSO_4 \cdot H_2O$.
[d] No aqueous phase—No $Na_2SO_4 \cdot 7H_2O$ formed.

The results show that only acids stronger than 80% give a completely neutral and colorless product in the absence of an aqueous phase. The failure of lesser strength acids to complete the neutralization to form the required amount of neutral sulfate is primarily due to the fact that most of the bisulfate is in solid form which can react only slowly, if at all, with solid spent catalyst. A contributory factor may be that much of the bisulfate adheres to the wall of the mixing vessel even with good agitation.

The nature of the present invention having been thus fully set forth and specific examples of the same given, what is claimed as new and useful and desired to be secured by Letters Patent is:

1. In a process for the preparation of drying oils wherein 75 to 100 parts of butadiene are copolymerized with 25 to 0 parts of styrene at a temperature of 20–100° C. in the presence of 1.5 to 10 parts of finely divided metallic sodium and 50 to 500 parts of an inert hydrocarbon diluent boiling between 20° and 200° C., and wherein residual sodium is removed upon completion of the reaction, the improvement which comprises treating the reaction product with an amount of aqueous sulfuric acid containing 82.5% to 96% $H_2SO_4$ to convert the sodium substantially quantitatively to sodium bisulfate.

2. Process according to claim 1 in which the monomers consist of 100% butadiene.

3. Process according to claim 1 in which the monomers consist of 80% butadiene and 20% styrene.

4. In a process for the preparation of drying oils wherein 80 parts by weight of butadiene are copolymerized with 20 parts by weight of styrene at a temperature of 50° C. in the presence of 300 parts by weight of naphtha, 30 parts by weight of dioxane, 0.3 parts by weight of isopropyl alcohol and 2 parts by weight of sodium, and wherein residual sodium is removed upon completion of the reaction, the improvement which comprises treating the reaction product with the theoretical amount of aqueous sulfuric acid containing 82.5% to 96% $H_2SO_4$ to convert the sodium substantially quantitatively to sodium bisulfate.

References Cited in the file of this patent

UNITED STATES PATENTS 2,543,440     Crouch  ---------------- Feb. 27, 1951